(No Model.) 2 Sheets—Sheet 1.
J. HOWES.
PURIFYING AND AERATING APPARATUS FOR WATER SERVICE.
No. 322,722. Patented July 21, 1885.
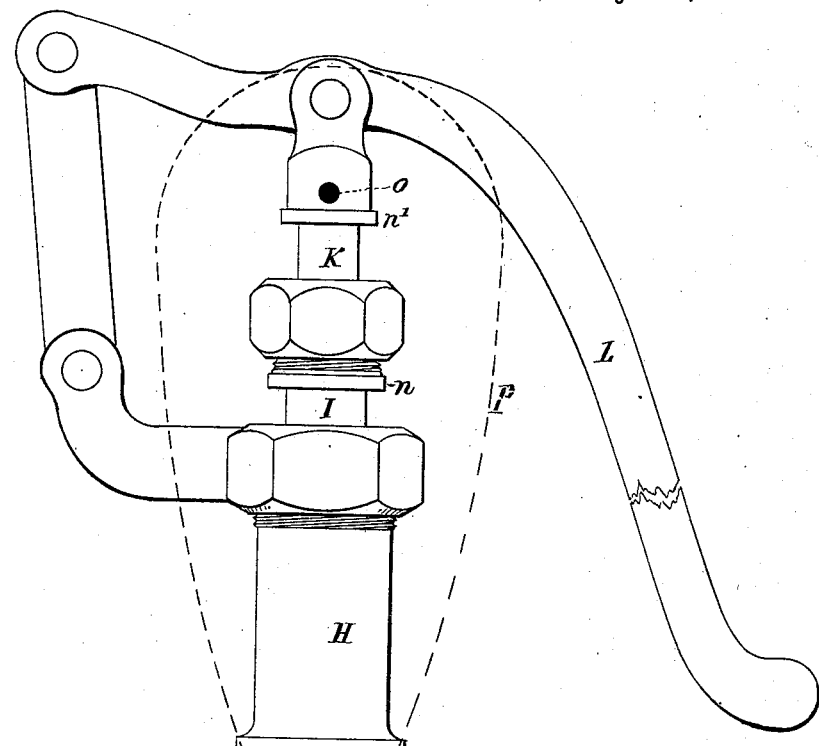
Fig. 1
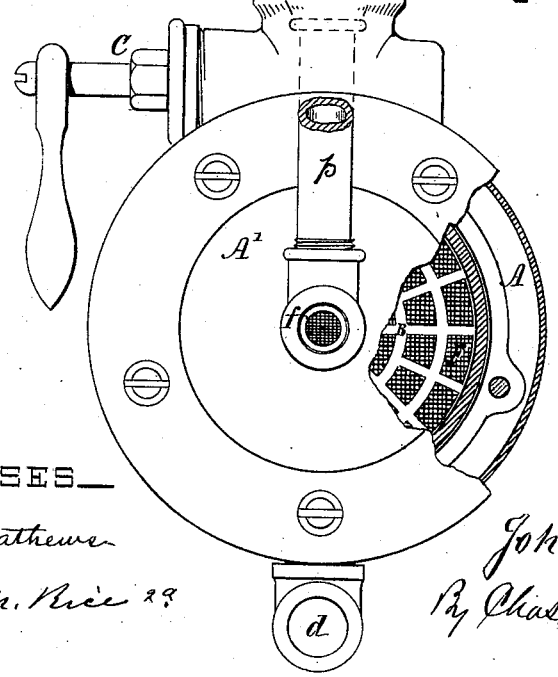
WITNESSES
A. W. Matthews
Geo. M. Rice
INVENTOR
John Howes
By Chas. H. Burleigh
Atty

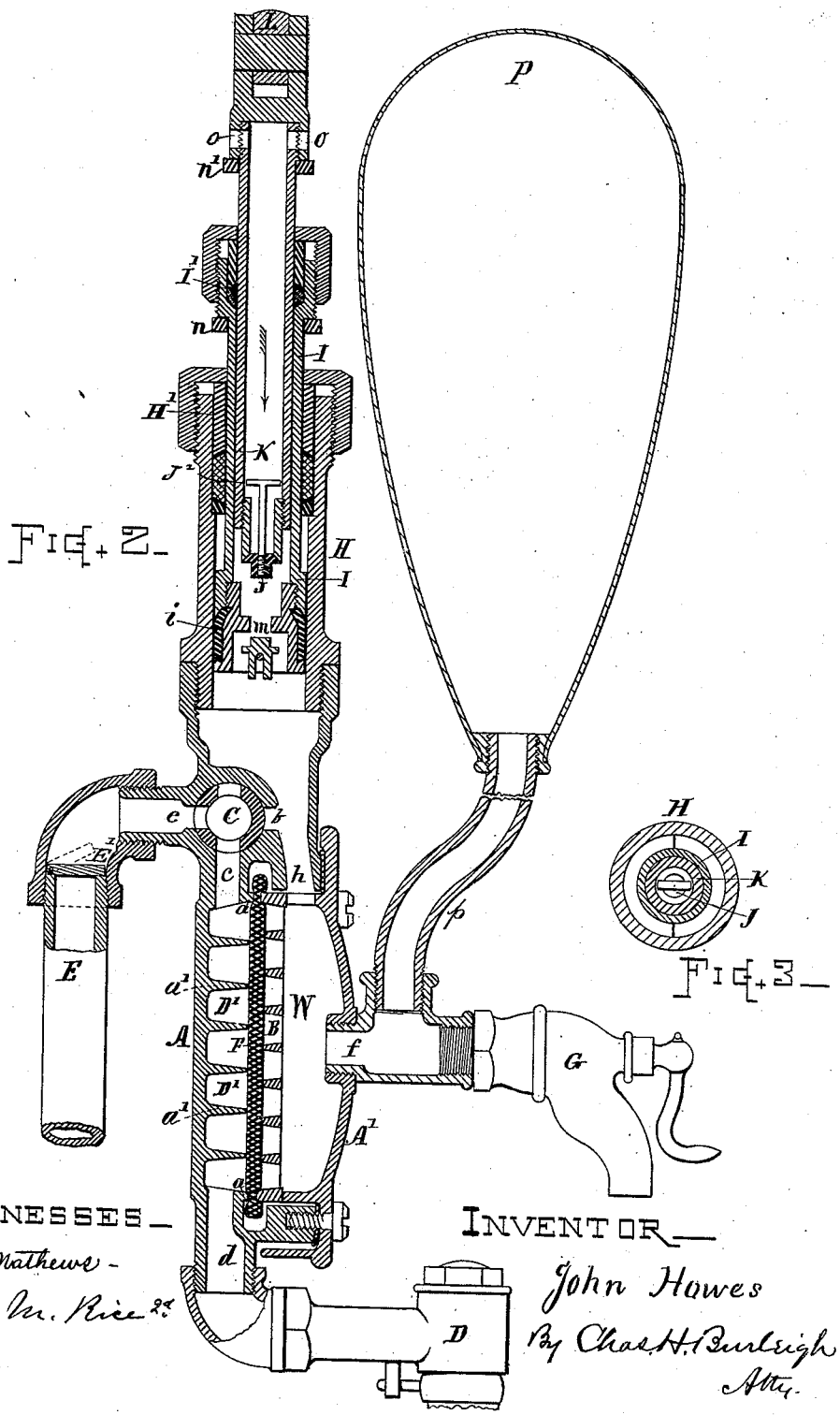

UNITED STATES PATENT OFFICE.

JOHN HOWES, OF WORCESTER, MASSACHUSETTS.

PURIFYING AND AERATING APPARATUS FOR WATER SERVICE.

SPECIFICATION forming part of Letters Patent No. 322,722, dated July 21, 1885.

Application filed August 29, 1883. (No model.)

*To all whom it may concern:*

Be it known that I, JOHN HOWES, a citizen of the United States, residing at Worcester, in the county of Worcester and State of Massachusetts, have invented certain new and useful Improvements in Purifying and Aerating Apparatus for Water Services and for other Purposes; and I declare the following to be a description of my said invention, sufficiently full, clear, and exact to enable others skilled in the art to which it appertains to make and use the same, reference being had to the accompanying drawings, which form a part of this specification.

My present invention relates to improvements in water-service apparatus adapted for purifying water for household and manufacturing purposes, the objects thereof being to provide means for pumping or mechanically introducing air into the interior of the filtering apparatus; also, to provide, in connection with a filtering apparatus, an air chamber or reservoir, into which air can be compressed for affording an increased and elastic pressure to impart a sudden reactive movement for assisting in cleansing the filter plates or material; also, to perfect the construction of the apparatus to render the devices compact, convenient, and efficient in use. The particular subject-matter claimed is hereinafter definitely specified.

In the drawings, Figure 1 represents a front view of an apparatus illustrating the nature of my invention. Fig. 2 is a vertical central section of the apparatus. Fig. 3 is a horizontal section through the upper portion of the pump-cylinder and the hollow plungers.

In referring to the drawings, A denotes the body-casting or filter-shell inwardly provided with an annular ledge, $a$, and transverse bars or partitions $a'$, for supporting the filter-plate F, which latter consists of disks of felt—one, two, or more—retained in position by means of the grate B, held down at its edges by the flanged cap-plate A', that forms the front of the shell.

C denotes the plug valve or cock for opening and closing the inlet-passages $e$, $b$, and $c$, by which the liquid enters the apparatus from the main or supply pipe E and by which it is directed to the back or front of the filter-plate F, the usual working position being that shown.

Letters $d$ and $f$ indicate the passages by which the liquid passes to the delivery-faucets D and G. The faucet D is for drawing off sediment and unfiltered liquid, and faucet G is for drawing filtered liquid. If desired, leaders or pipes may be connected in place of the faucets G and D, or either of them, to convey the liquid to any desired place of use, the faucets being there located.

The space at the back of the filter-felt F is divided by the partitions $a'$ into a narrow serpentine channel or water-way, D', communicating with the inlet $c$ and delivery-passage $d$, or forming a continuation of said passages, in the manner substantially similar to that described in my former Letters Patent No. 276,820.

H indicates an air-pump or a combined air-and-liquid pump communicating with the filtrate-chamber W by suitable passage, $h$. Said pump is in the present instance made as shown, and consists of a cylinder screwed to the shell A, and within said main cylinder is arranged a reciprocating hollow plunger or piston, I, that in turn forms the cylinder for an inner plunger or piston, K, which latter is also hollow and provided with an air-valve, J, and with an inlet, $o$. This piston K is furnished with a suitable handle, L, for effecting reciprocative movement of the piston K. The outer pump or plunger, I, is reciprocated by movement of the handle L beyond the limit of the inner piston, K. When the handle L is depressed, the part K, being of smaller diameter than the plunger I, is opposed by less pressure from the interior than is said plunger I, and it is therefore forced downward within the plunger I until its end is brought into contact with the piston-head, when further depression of the handle L and piston K necessarily overcomes the resistance of the service-pressure on the larger piston and forces downward the part I within the cylinder H, in connection with the part K. With the upward movement of the handle L the service-pressure on the plunger I causes said plunger to rise with the upward movement of the piston K until the shoulder near the lower end of the plunger I strikes the under side of the packing-ring and prevents its further upward movement, and the continued upward action of the handle then carries up the piston K within the plunger I. The two parts K and I could, if desired, be connected by a slotted link or by lugs working in slots or grooves, so as to effect the action without reference to the service-pressure; but under ordinary circumstances the pressure will raise the plunger I in the manner stated, and is deemed preferable.

The arrangement of the various parts of the pump mechanism is shown in Fig. 2. The head of the piston I is properly packed, as at $i$, and is provided with a downwardly-opening valve, $m$. A stuffing-box, H', is provided at the top of the cylinder H, through which the plunger I moves, and a suitable stuffing-box, I', is formed on the upper end of said plunger for packing the inner plunger, K.

A cushion or buffer ring, $n$, may be arranged about the neck of the plunger I, for preventing shock when it is forced downward against the cylinder-cap and a buffer or leather ring, $n'$, may be placed on the plunger K for a similar purpose.

The valve J is provided with a cross-headed stem, $J^2$, to limit its movement from its seat; or it may be otherwise confined to prevent its displacement or escape while in use. The end of the piston K and valve J are made to entirely fill the interior space of the plunger I, when forced downward, so that all air contained therein will be expelled through the valve $m$ to the interior of the filter.

In the operation of the air-pump on the upward stroke of the piston K, air enters at the openings $o$, and passes down beneath the valve J, and such air is from thence forced down past the valve $m$ to the interior of the filter by the downward stroke of the piston K. The piston I serves to pulsate or augment the flow of liquid through the filter-plate F, by mechanical action at the same time that air is forced into the interior with the liquid.

The air-pump piston K is operated by the upper portion of the stroke of the brake or handle L, and the water-piston I by the lower portion of the stroke of said brake. Hence either of the pistons K or I can be worked without moving the other by simply working the brake or handle L within the limit of that portion of its stroke corresponding to the limit of action of the respective pistons, or both of said pistons can be operated together by giving the full stroke of the brake or handle. By this means air may be injected into the filter-chamber W without the discharge of the water by working the air-pump only to the limit of the stroke or movement of its piston K; or, again, the liquid may be pulsated through the filter without the introduction of air by working the piston of the liquid-pump only, which is accomplished at the lower part of the stroke of the handle or brake; or, again, the injection of air and the pulsation of the liquid can be simultaneously effected by working the handle the full extent of its stroke from the highest to the lowest position of its action. When pulsating the liquid, the lower faucet, D, or cleansing-vent should be open to permit the liquid to pass through the felt F.

In the use of the apparatus for water service, where the pressure is comparatively light, a check-valve. E', should be placed in the supply-pipe E, that the full effect of the pump may be utilized without forcing the water back against the fountain-head through the passage $e$.

The check-valve may be connected in the pipe E in the ordinary manner, and at any convenient position. In cases where there is heavy service-pressure the check-valve may be omitted or employed, as preferred or most convenient, as in such cases, with the cock G or D open, there would be little or no liability of creating a backward flow in the pipe E when working the pump devices.

An air-chamber or compress-reservoir, P, is connected with the filtrate-chamber W or delivery-passage $f$ by a pipe, $p$, leading therefrom. This reservoir receives the air forced into the interior of the apparatus by the pump K, and said air being compressed therein serves to accumulate force for giving a reactive movement of the liquid through the filter-plates when the cleansing-passages are opened. Said reservoir may be located in the immediate vicinity of the filter, or the connecting-pipe $p$ may be extended to any convenient height above the filtering apparatus—as, for instance, to the upper stories of a building or to the upper part of a room—where it will be out of the way and afford a greater degree of reactive force by additional height above the apparatus.

By the aid of the air-pump and air-reservoir the pressure can be increased within the apparatus, so that a very forcible reactive movement or flow can be attained for cleansing the felt F of the filter when delivery D is opened, even though the nominal supply pressure is very tight. The reservoir P also enables the filtered liquid to be stored under air-pressure, and this pressure forced or accumulated to any desired degree to assist the flow of the liquid through pipes to any location where it is desired for use. The pump also permits of air being added to the liquid for aerating purposes, if desired.

The air-pump mechanism herein described may be employed with filtering devices of other construction than that herein shown with beneficial results, and I design to employ it when desired in connection with the several kinds of filters such as are described in my former Letters Patent.

What I claim as of my invention, and desire to secure by Letters Patent, is—

1. The combination, with a filtering apparatus, of an air-pump mechanism for injecting air to the interior of said filter, and an air-reservoir into which said air can be compressed for imparting reactive movement when the filter-cleansing cock is opened, substantially as and for the purpose described.

2. The combination, with a filtering apparatus, of a combined air and water pump adapted for simultaneously injecting air to the interior of the filter and pulsating the liquid therein, and for forcing air and liquid through the filter plates or material for the purposes of cleansing, substantially as hereinbefore set forth.

Witness my hand this 25th day of August, A. D. 1883.

JOHN HOWES.

Witnesses:
   CHAS. H. BURLEIGH,
   CHAS. D. GAY.